United States Patent

Kitakami et al.

[11] Patent Number: 5,496,620
[45] Date of Patent: Mar. 5, 1996

[54] MAGNETIC RECORDING MEDIUM

[75] Inventors: Osamu Kitakami; Kunio Wakai, both of Ibaraki; Kazuetsu Yoshida, Kodaira, all of Japan

[73] Assignees: Hitachi Maxell, Ltd., Osaka; Hitachi Ltd., Tokyo, both of Japan

[21] Appl. No.: 334,125

[22] Filed: Nov. 4, 1994

Related U.S. Application Data

[63] Continuation of Ser. No. 803,558, Dec. 9, 1991, abandoned.

[30] Foreign Application Priority Data

Dec. 13, 1990 [JP] Japan ..................... 2-410420

[51] Int. Cl.[6] ...................................... G11B 5/00
[52] U.S. Cl. .................. 428/212; 428/457; 428/694 T; 428/900
[58] Field of Search ............... 428/694 T, 451, 428/900, 212

[56] References Cited

U.S. PATENT DOCUMENTS

| | | | |
|---|---|---|---|
| 4,323,629 | 4/1982 | Kunieda et al. | 428/457 |
| 4,599,280 | 7/1986 | Izumi et al. | 428/694 |
| 4,797,330 | 1/1989 | Nasu et al. | 428/694 |
| 4,855,175 | 8/1989 | Wakai et al. | 428/148 |
| 4,908,722 | 3/1990 | Sonobe | 360/46 |
| 4,968,564 | 11/1990 | Tada et al. | 428/433 |
| 5,000,995 | 3/1991 | Kishi et al. | 428/64 |
| 5,066,552 | 11/1991 | Howard et al. | 428/694 |

FOREIGN PATENT DOCUMENTS 58-083327  5/1983  Japan.
59-140629  8/1984  Japan.

Primary Examiner—Stevan A. Resan

[57] ABSTRACT

A medium in which a magnetic layer is composed mainly of Co and oxygen and has a principal axis of magnetic anisotropy rising unidirectionally at 20° to 80° to a nonmagnetic substrate surface, the coercive force Hs on the surface side of the magnetic layer is 600 to 2,000 Oe and the coercive force Hb on the substrate interfacial side is less than 600 Oe, the medium being produced by treating a nonmagnetic substrate surface with a plasma in an atmosphere of an inert gas or an oxygen gas, and then depositing an alloy composed mainly of Co on the above plasma-treated nonmagnetic substrate surface while an oxygen gas is introduced into the layer-forming atmosphere.

4 Claims, 4 Drawing Sheets

MAGNETIC RECORDING MEDIUM

This application is a continuation of application Ser. No. 07/803,558, filed on Dec. 9, 1991 now abandoned, the entire contents of which are hereby incorporated by reference.

BACKGROUND OF THE INVENTION

1. Field of the Invention

The present invention relates to a magnetic recording medium. More specifically, it relates to a magnetic recording medium having an improved reproduction output and a process for the production thereof.

2. Discussion of Related Art

With an increase in a demand for high-density recording, vigorous technical improvements have been advancing in a variety of fields of optical recording, semiconductor memory, etc. In particular, in the field of magnetic recording, magnetic thin layers of Co—Ni, etc., as a substitute for conventional magnetic powder-coated recording media are now vigorously being studied as a high-density recording material.

Further, recently there has been a trend from a conventional longitudinal recording method to a perpendicular recording method to achieve still higher-density recording. In this recording method, a demagnetizing field effecting recorded magnetization decreases with an increase in recording density. Therefore, this method is said to be, in principle, suitable for high-density recording.

A Co—Cr alloy thin layer has been widely studied as an ordinary material for a perpendicular recording medium, while a Co—O perpendicular magnetic thin layer such as disclosed in Japanese Unexamined Patent Publication No. 59-140629 is being generally studied as a material for a perpendicular magnetic recording tape.

In the beginning, the above thin layer has been formed by a method in which Co vapor is deposited onto a substrate surface nearly perpendicularly while an oxygen gas is introduced into a layer-forming atmosphere. In the layer formed by this method, the principal axis of magnetic anisotropy is nearly perpendicular to the layer surface, and such a structure has been considered to be optimum for perpendicular recording.

Although there has been a recent attempt to increase a reproduced output by tilting the principal axis of magnetic anisotropy from a normal of the layer surface, it cannot be said that a value of the reproduced output is sufficient for practical use.

SUMMARY OF THE INVENTION

It is an object of the present invention to overcome the defect of insufficient reproduced output of such prior art and provide a magnetic recording medium having excellent recording and reproducing characteristics, a process for the production thereof, and a magnetic recording system.

In order to achieve the above object, the present invention provides a magnetic recording medium which has a magnetic layer being composed mainly of Co and oxygen and having a principal axis of magnetic anisotropy rising unidirectionally at 20° to 80° to a nonmagnetic substrate surface, wherein the coercive force Hs on the layer surface side of the magnetic layer is greater than the coercive force Hb on the substrate interfacial side.

Figure 1:
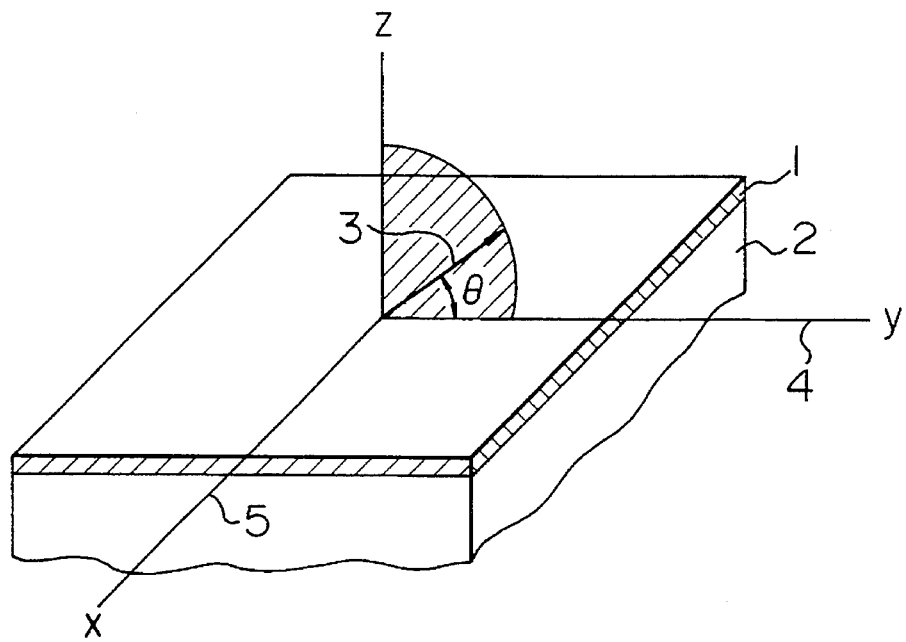
FIG. 1 is a schematic view of the structure of a recording medium of the present invention.

DESCRIPTION OF THE REFERENCE NUMERALS IS AS FOLLOWS:

1. Magnetic layer
2. Substrate
3. Principal axis of magnetic anisotropy
4. Easy axis of magnetization in the film plane
5. Hard axis of magnetization in the film plane
6. Recording layer
7. High coercive force layer
8. Low coercive force layer
9. Roll
10. Guide roll
11. Can roll
12. Variable leak valve
13. Evacuation outlet
14. Evaporation source
15. Mask
16. Plasma chamber
17. Alternate current electricity source
18. Substrate It is preferred that the coercive force Hb is less than 600 Oe and that the coercive force Hs ranges from 600 to 2,000 Oe.

Further, the present invention also provides a process for the production of a magnetic recording medium, which comprises treating a nonmagnetic substrate surface with a plasma in an atmosphere of an inert gas or an oxygen gas, and then depositing Co or an alloy composed mainly of Co on the above plasma-treated nonmagnetic substrate surface while an oxygen gas is introduced into the layer-forming atmosphere.

The present inventors have further conducted extensive research in order to attain the above object. As a result, it has been found that excellent characteristics in recording can be obtained in a wide range of recording density by use of a deposited film which shows a reproduced wave dipulse ratio (r) of not less than 0 but not more than 0.3 when recording is reproduced by means of a ring type magnetic head, and which film has a composition of $(Fe_xCo_yNi_z)_{100-m}O_m$ wherein $x+y+z=100$, $0 \leq X \leq 10$, $0 \leq z \leq 40$ and $5 \leq m \leq 20$.

In this magnetic recording medium, it is preferable that the average principal axis of magnetic anisotropy rise at 40° or more to the film plane after demagnetizing field compensation.

The above-mentioned ring type magnetic head preferably has a gap length of from 0.1–0.5 μm.

As described above, the present invention is so constituted that a magnetic layer composed mainly of Co and oxygen and having a principal axis of magnetic anisotropy rising unidirectionally at 20° to 80° to a nonmagnetic substrate surface is provided and that the coercive force Hs on the layer surface side of the magnetic layer is greater than the coercive force Hb on the substrate interfacial side.

By adopting the above structure, a high reproduction output and a high S/N ratio can be attained as compared with the case where a layer has uniform magnetic characteristics in the layer thickness direction.

The magnetic recording medium of the present invention is detailed by reference to FIG. 1. The anisotropic principal axis 3 of a layer is assumed to be present in a yz plane and be rising from the y axis at an angle of θ. In this case, the x axis is defined to be a hard axis of magnetization 5 in the film-plane, and the y axis, an easy axis of magnetization 4 in the film-plane. When this magnetic thin layer is used for recording and reproducing with a ring-type magnetic head and when the head moves in the y direction, the inclination angle of the anisotropic principal axis is required to be in the range of from 20° to 80° C. before demagnetizing field compensation, in order to obtain a high reproduction output in an entire recording density area.

When θ is less than 20°, the high-density recording characteristic is as inferior as that of conventional longitudinal recording. When θ exceeds 80°, an excellent high-density recording characteristic is obtained by forming stable perpendicular magnetization mode. In this case, however, no sufficient recording is possible with a ring head, because of the lack of a perpendicular field from the head for saturating the recording layer, and the reproducing output and the overwrite S/N are decreased. For these reasons, the best recording and reproducing characteristics can be attained when θ is in the range of from 20° to 80°.

Further, the present inventors have also found that further improved recording and reproducing characteristics can be obtained when the coercive force Hs on a layer surface is rendered higher than a value Hb for the coercive force on a substrate interfacial surface in the θ range of from 20° to 80°.

Films have been specifically measured for a difference in magnetic characteristics between the top surface, and bottom surface, from the top and bottom surfaces of the layers, by means of a magneto-optical effect (in this case Kerr effect). It has been consequently found that excellent recording characteristics can be obtained when the coercive force Hs is in the range of from 600 to 2,000 Oe, preferably 800 to 1500 Oe, and the coercive force Hb is less than 600, preferably 300 to 500 Oe.

Figure 2:
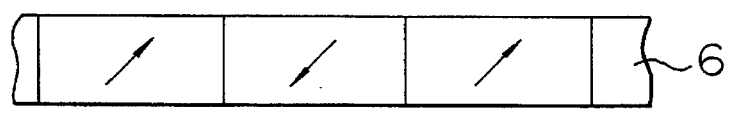
FIGS. 2 and 3 are schematic views illustrating the reason for an improvement in output of a recording medium of the present invention.
Figure 3:
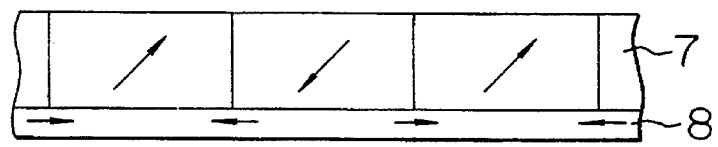

The reason for such an improvement in recording and reproduction characteristics by rendering the Hs force higher than Hb can be considered as follows. FIGS. 2 and 3 schematically show recording patterns in cross-sections of a recording layer. FIG. 2 shows a case in which a recording layer has uniform magnetic characteristics in the layer thickness direction. In this case, demagnetizing fields from free magnetic poles generated on the top and bottom surfaces of the layer work on recorded magnetization, and the layer suffers high demagnetization. In contrast, in FIG. 3, a region 8 having a low coercive force is present in a substrate interfacial surface to close the recording pattern by forming a semi-open magnetic circuit. As a result, the demagnetizing field influencing the recorded magnetization decreases, and the recorded magnetization increases, whereby an improved output is obtained.

In addition, the recording medium as an object of the present invention has a magnetic thin layer composed mainly of Co and oxygen. The expression "composed mainly of Co and oxygen" means that the atomic ratio of the total of Co and oxygen compared to components constituting the magnetic thin layer exceeds 50 at %. Therefore, an alloy containing Co and any one of Fe, Ni, Cr, Ti, can be used as a ferromagnetic substance for forming the magnetic thin layer, as well as Co. Other alloys of Co can be also naturally used.

When organic polymer films of polyethylene terephthalate (PET), polyimide, polyphenylene sulfide, polyethylene naphthalate, etc., are used as a substrate, the substrate surface is exposed to a plasma of an inert gas of argon or nitrogen or an oxygen gas before formation of a magnetic layer, and then an alloy composed mainly of Co is deposited while an oxygen gas is introduced into the layer-forming atmosphere, whereby the coercive force Hs on the layer surface can be rendered greater than the coercive force Hb. The difference between Hs and Hb is greatly enhanced when the principal axis of magnetic anisotropy is inclined to the film plane 40°–80° after correction of demagnetizing effect.

An exact mechanism in which the coercive force Hs on the layer surface is rendered greater than the coercive force Hb by deposition of a magnetic layer after the plasma treatment of the substrate surface has not yet been made clear, and therefore, the following is no more than speculation. When the plasma treatment is carried out, the crystal orientation of a magnetic substance is disordered on the substrate side, and the coercive force decreases. The crystal orientation of the magnetic substance is arranged in the coercive force increases. In this case, the plasma treatment is carried out under a gas (e.g., inert gas or oxygen gas) pressure of 0.001 to 1 torr, preferably 0.003 to 0.5 torr, and at a plasma power density of 0.01 to 5 W/cm$^2$.

The magnetic recording medium of the present invention can be also produced by another method in which a magnetic layer of a multi-layered structure of which the coercive force consecutively increases from the substrate side, is formed by adjusting the amount of oxygen for introduction during the deposition of a ferromagnetic substance, or by adding another element of a magnetic substance to a Co—O-based magnetic substance and adjusting the amount thereof.

Figure 8:
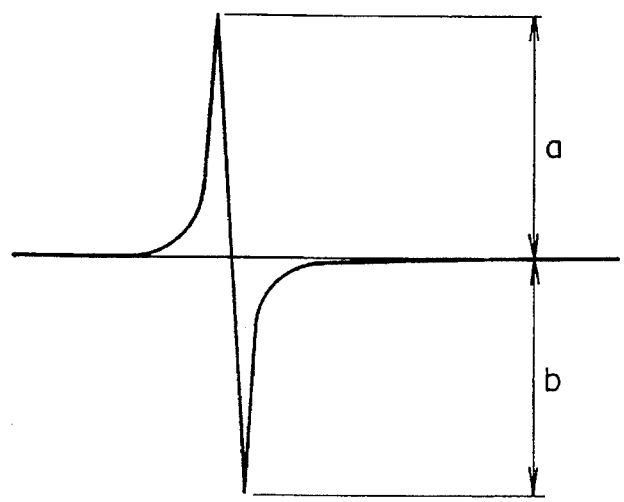
FIG. 8 is a schematic view for determination of a dipulse ratio of a reproduced signal.

The term "dipulse ratio" referred to in the present specification means a ratio (r) of pulse amplitude below the base line (b) to that above the base line (a) (r= b/a, 0≤r≤1) in reproduced waveforms as shown in FIG. 8.

In order to further improve the characteristics in high-density recording, it is effective that the average principal axis of magnetic anisotropy rises at 40° or more to the film plane after demagnetizing field compensation. In view of simplicity, information on magnetic anisotropy is generally obtained by the analysis of magnetization curves measured using a vibrating sample magnetometer (VSM). For a purpose of more precise study, however, a torque magnetometer has to be used. Therefore, the present inventors employed this method to determine the principal axis direction of magnetic anisotropy and anisotropic constant of magnetic films, in which method torque curves were subjected to a Fourier analysis and demagnetizing field compensation, whereby these values were calculated. As a result, it has been found that excellent characteristics in high-density recording can be obtained in magnetic films having a dipulse ratio (r) of 0– 0.3 especially when the principal axis of magnetic anisotropy rises at 40° or more to the film plane. In this case, especially excellent results were obtained in magnetic films having an anisotropic constant (k) of $5 \times 10^4$ to $5 \times 10^6$ erg/cc.

The film of $(Fe_xCo_yNi_z)_{100-m}O_m$ always shows the above-mentioned recording and reproducing characteristics when recording and reproducing are carried out using a ring-type head. However, such characteristics conspicuously appear when the head has a gap length of 0.1 to 0.5 μm. It is also preferable that x+y+z=100, $0 \leq x \leq 10$, $0 \leq z \leq 40$ and $5 \leq m \leq 20$ in the formula $(Fe_xCo_yNi_z)_{100-m}O_m$. The film may contain a small amount of elements other than these elements.

The magnetic recording medium of the present invention can be produced by any suitable process. For example, a process may be employed wherein a nonmagnetic substrate is subjected to sputtering or vapor deposition such as vacuum evaporation. Alternating plating or pulse plating may also be employed. These processes are well-known to any person skilled in the art.

In the present invention, it is not essential that the magnetic recording medium include a nonmagnetic underlayer. Such a underlayer improves magnetic recording properties or prevents the recording medium from plastic deformation of the magnetic recording layer by mechanical forces acting between a magnetic head and a medium. The underlayer is composed of, for example, Cr, Ti, Al, B, C, Cu, $SiO_2$, SiC, TiN, $Al_2O_3$ or $Cr_2O_3$.

The magnetic recording medium of the present invention is a so-called thin film magnetic recording medium of which the magnetic layer is formed by depositing a ferromagnetic substance on a nonmagnetic substance by means of a vapor deposition method. This medium itself is well known to those of ordinary skill in the art, and it will not be required to add any further explanation.

The magnetic film used in the magnetic recording medium of the present invention has a thickness of 1 μm or less, preferably 500–5000 Å.

Examples of the nonmagnetic substrate used in the magnetic recording medium of the present invention are polymer films of polyimide, polyethylene terephthalate, etc., glass, ceramic, anodized aluminum, metal plates of brass, a Si single crystal plate, a Si single crystal plate of which the surface is subjected to thermal oxidation and the like in addition to an aluminum substrate.

The magnetic recording medium of the present invention includes media of a variety of forms in which the media are in contact with a magnetic head while sliding, such as a magnetic tape and a magnetic disk which use, as a substrate, a synthetic resin film such as a polyester film, a polyimide film, or the like, and a magnetic disk and a magnetic drum which use, as a substrate, a disk or a drum composed of a synthetic resin film, an aluminum plate, a glass plate, or the like.

PREFERRED EMBODIMENTS

Example 1

The present invention will be explained further in detail by reference to Examples.

Figure 4:
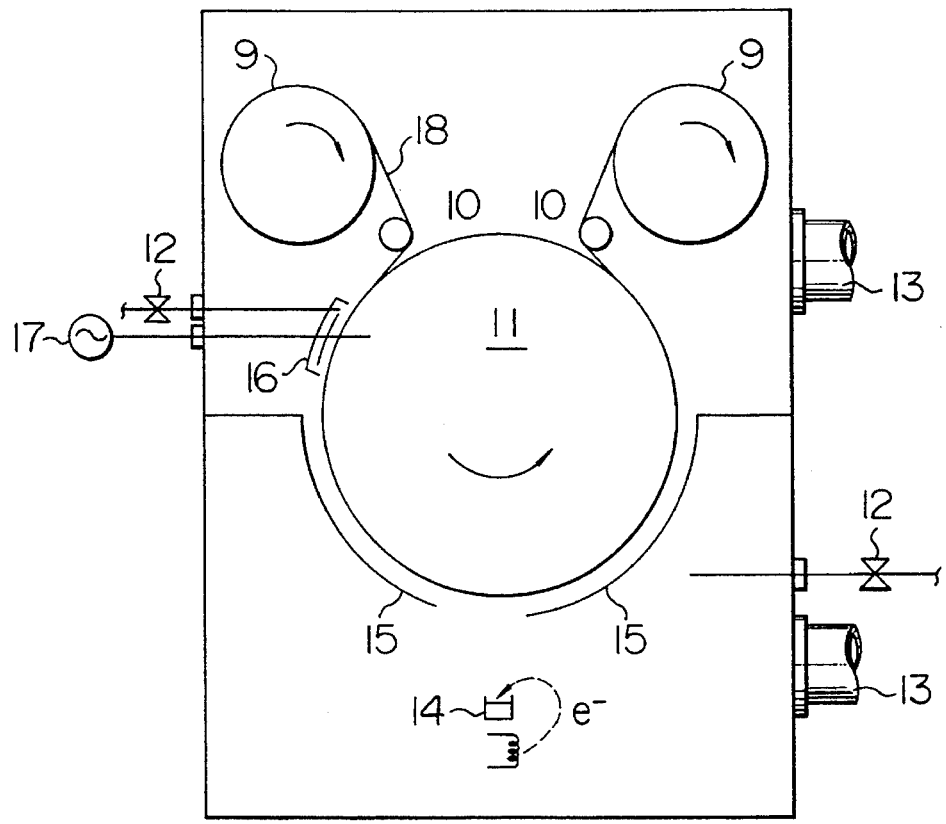
FIG. 4 is a schematic view of an apparatus for vacuum deposition used in the examples.

FIG. 4 shows a schematic view of an apparatus for forming thin films, used in experiments. A PET film substrate 18 having a thickness of 8 μm was delivered from a roll 9, and while the film was delivered along a water-cooled can roll 11, the film surface was exposed to Ar gas plasma in a plasma chamber 16. Then, vapor from a Co evaporation source 14 was deposited on the substrate surface in a thickness of 2,000 Å, and the film was finally taken up to a roll 9. During the deposition, an oxygen gas was introduced through a variable leak valve 12.

Figure 5:
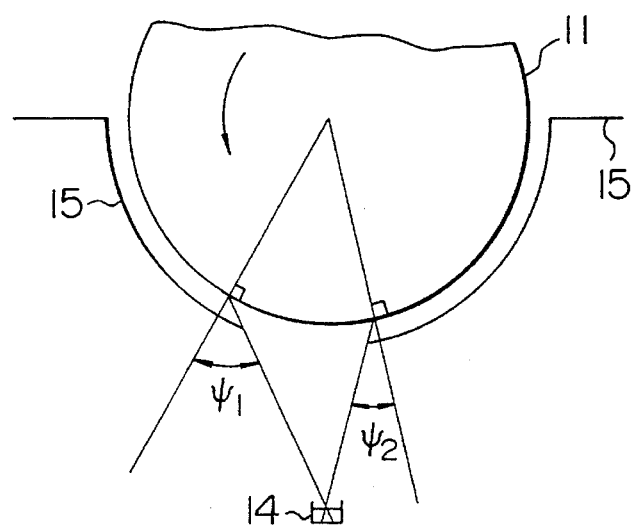
FIG. 5 is an enlarged schematic view of a deposition portion.

FIG. 5 shows an enlarged view of the deposition portion. The incident angle of vapor generated from the evaporation source 14 was controlled with a mask 15. In this case, the incident angle was defined as $\psi_1$, and the outgoing angle, as $\psi_2$. With an increase in the incident angle $\psi_1$, the rise angle θ for the principal axis of magnetic anisotropy increases, which does not necessarily mean $\psi_1$=θ.

Seven samples were prepared with the above apparatus by changing the film fabrication conditions.

Figure 6:
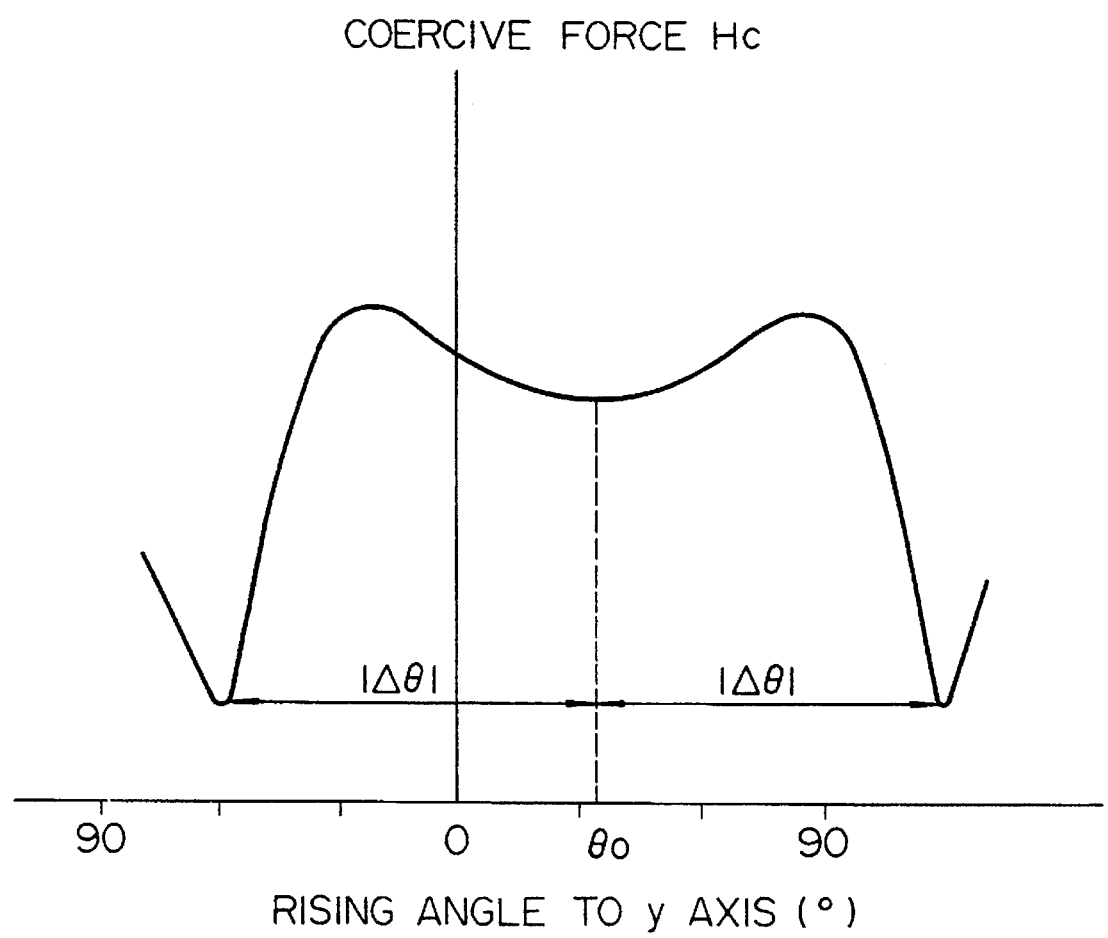
FIG. 6 is a characteristic view for the dependence of the coercive force of a recording medium of the present invention on angles.

The principal axis of magnetic anisotropy of the layer formed as above by angled incidence rises from the film plane as shown in FIG. 1, and the change in the coercive force in the yz plane of the layer is generally as shown in FIG. 6. As shown in this Figure, there are two angles at which the coercive force is minimized, and the center θ between these two angles is defined as a rise angle of the principal axis of magnetic anisotropy before demagnetizing field compensation.

The coercive force on each of the top and bottom surfaces of the layer in the easy axis direction in the film plane (y axis in FIG. 1) was measured using a Kerr effect (wavelength 830 nm). The recording and reproduction characteristics were measured with a metal-in-gap type ring head having a gap length of 0.19 μm. In addition, recording media were slit into tapes having a width of ½ inch, and the tapes were used for evaluation. Table 1 shows the results of evaluation of the magnetic characteristics and recording characteristics of the above prepared samples.

TABLE 1

| Sample | Plasma treatment | θo (°) | Ms (G) | Hs (Oe) | Hb (Oe) | $E_{10}k$* | $D_{50}$ (kFCl) | S/N (dB) |
|---|---|---|---|---|---|---|---|---|
| 1 | No | 15 | 820 | 1100 | 1050 | 0.16 | 85 | 41 |
| 2 | Done | 15 | 830 | 1050 | 460 | 0.17 | 80 | 46 |
| 3 | No | 30 | 815 | 1130 | 950 | 0.14 | 115 | 44 |
| 4 | Done | 30 | 820 | 1050 | 520 | 0.22 | 110 | 53 |
| 5 | No | 70 | 835 | 1000 | 890 | 0.12 | 135 | 43 |
| 6 | Done | 70 | 810 | 950 | 250 | 0.19 | 140 | 51 |
| 7 | No | 90 | 810 | 880 | 680 | 0.13 | 130 | 38 |

*: Unit of $E_{10k}$ is $\mu V_{p-p}/\mu m \cdot m/s \cdot turn$.

As shown clearly in Table 1, the deposition after the plasma treatment produces clear difference between Hs and Hb. The results show the following: In the case of the samples having $\theta_O$ in the range of from 30° to 70°, the magnetic characteristics of the magnetic layers obtained by the deposition after the plasma treatment are remarkably superior to the samples which were not subjected to the plasma treatment.

As specified above, in a magnetic recording medium which has a magnetic layer composed mainly of Co and oxygen and having a principal axis of magnetic anisotropy rising unidirectionally at 20° to 80° to a nonmagnetic substrate surface, the reproduction output can be greatly improved by rendering the coercive force Hs on the layer surface side of the magnetic layer greater than the coercive force Hb on the substrate interfacial side.

Other examples of the present invention are shown below in order to further explain the invention in detail.

Example 2

On a PET film substrate 8 μm in thickness was formed a Co—O film by a vacuum evaporation method in which oxygen gas was introduced into a vacuum chamber and Co is deposited varying the incident angle to form Co—O films 0.25 μm in thickness. Magnetic characteristics of the thus formed film were measured using a torque magnetometer (maximum applied magnetic field: 15 kOe) and a vibrating sample magnetometer (maximum applied magnetic field: 10 kOe). The Co—O film samples were cut into tapes 0.5 inch in width. And then digital recording and reproduction were carried out using a thin film head (gap length: 0.2 μm) having a magnetic pole of permalloy to evaluate the samples.

Magnetic characteristics of the samples and dipulse ratios thereof when a signal of 10 kFCI was recorded are shown in Table 2.

Comparative Example 1

Recording characteristics of samples 16 and 17 were evaluated using as a MIG head with a gap length of 0.54 μm. As a result, little difference was found between these samples in $E_{10k}$; however, their −6 dB roll off density were greatly deteriorated.

As described above, in the present invention, (FeCoNi) films having excellent characteristics in wide range of recording density can be obtained by rendering dipulse ratio of less than 0.3 when recording and reproduction are carried out using a ring head having a gap length of 0.1–0.5 μm, and raising the main axis of magnetic anisotropy at 40° or more to the film plane.

TABLE 2

| Sample | Saturation magnetization, Ms (G) | Direction of principal axis of magnetic anisotropy after demagnetizing field compensation, θ (°) | Dipulse ratio, r | Hs | Hb |
| --- | --- | --- | --- | --- | --- |
| 8 | 830 | 30 | 0 | 1200 | 1200 |
| 9 | 850 | 43 | 0 | 1020 | 950 |
| 10 | 800 | 73 | 0.15 | 1100 | 1100 |
| 11 | 870 | 90 | 0.30 | 1200 | 890 |
| 12 | 930 | 90 | 0.40 | 1050 | 870 |
| 13 | 480 | 90 | 0.50 | 830 | 840 |

Figure 7:
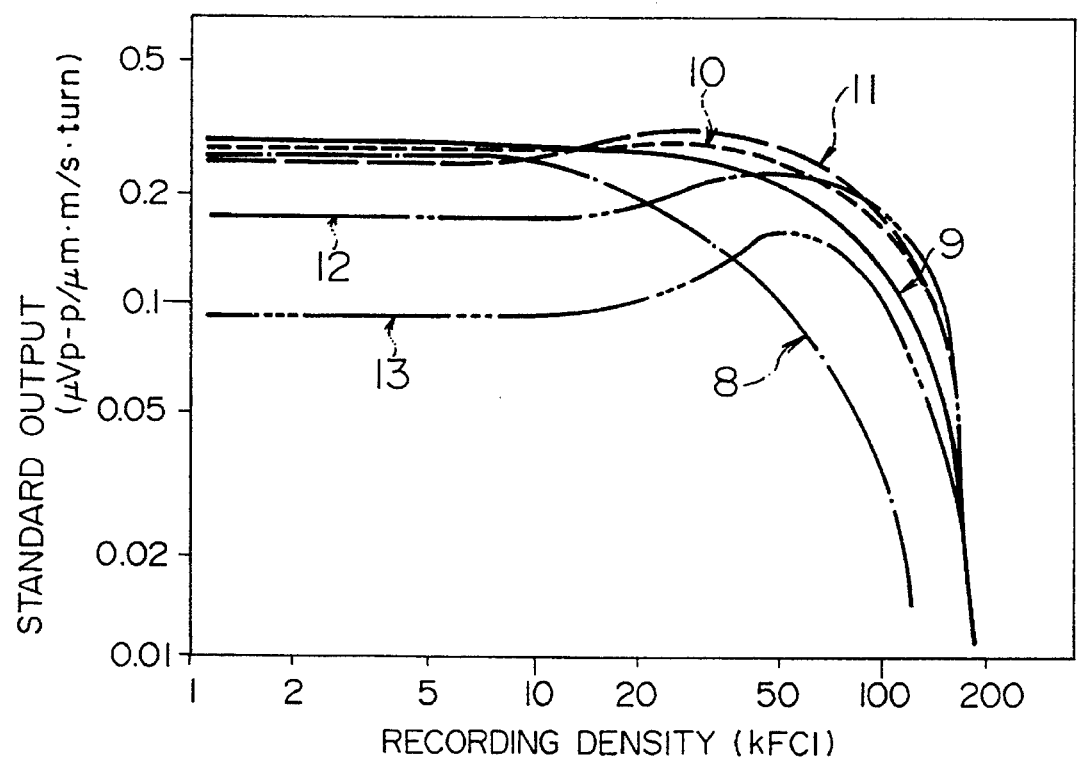
FIG. 7 illustrates curves showing recording density characteristics of samples shown in Table 2 in Example 2.

FIG. 7 illustrates curves of recording density characteristics of the samples shown in Table 2. It is clearly shown that high reproduction output is obtained when the pulse ratio of reproduction signal is less than 0.3, and that characteristics in high density recording are improved when the principal axis of magnetic anisotropy after demagnetizing field compensation rises at 40° or more to the film plane.

Example 3

Films were produced under the same condition as in Example 2 and evaluated on their magnetic and recording characteristics, except that $Co_{85}Ni_{15}$ was used as a Co vaporization source. A metal-in-gap type ring head (so-called MIG head) was used for evaluating the recording characteristics of the above magnetic films. The gap length and saturation flux density of the head were 0.32 μm and 9,200 g, respectively.

The results are shown in Table 3. In this table, $E_{10k}$ means normalized output at recording density of 10 kFCI, and $D_{50}$ means −6 dB roll off density.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. The product produced by the process for the production of a magnetic recording medium, said process comprising the following ordered steps:

(a) treating a nonmagnetic substrate surface with plasma in an atmosphere of an inert gas or an oxygen gas; and (b) depositing a magnetic film formed from an alloy including cobalt and oxygen, said oxygen content in said magnetic film having an atomic ratio of at least 5%, said magnetic film having a principal axis of magnetic anisotropy rising unidirectionally at 20° to 80° to form an interfacial surface of said film with said non-magnetic substrate before demagnetizing field compensation, and an average principal axis of magnetic anisotrophy rising at 40° or more to said film plane after demagnetizing field compensation, wherein

TABLE 3

| Sample | Saturation magnetization, Ms (G) | Direction of principal axis of magnetic anisotropy after demagnetizing field conpensation, θ (°) | Dipulse ratio, r | $E_{10k}$* | $D_{50}$ (kFCI) | Hs | Hb |
| --- | --- | --- | --- | --- | --- | --- | --- |
| 14 | 640 | 25 | 0 | 0.18 | 55 | 890 | 850 |
| 15 | 630 | 40 | 0.05 | 0.18 | 85 | 890 | 800 |
| 16 | 670 | 90 | 0.25 | 0.16 | 95 | 970 | 630 |
| 17 | 615 | 90 | 0.45 | 0.09 | 95 | 970 | 850 |

*: Unit of $E_{10k}$ is $\mu V_{p-p}/\mu m \cdot m/s \cdot turn$.

As is clear from the results shown in Table 3, the sample having a dipulse ratio of 0.25 and direction of principal axis of magnetic anisotropy of 90° is superior to the others in the recording characteristics.

a coercive force Hs on a surface side of said magnetic layer, which ranges from 600 to 2000 Oe. is greater than a coercive force Hb on said interfacial surface of said substrate, said coercive force on said interfacial surface being 520 Oe. or less, and said magnetic layer having a dipulse ratio r of from 0 to 0.3.

2. The product of claim 1, wherein said magnetic film including cobalt and oxygen comprises an alloy represented by $(Fe_xCo_yNi_z)_{100-m}O_m$ wherein x+y+z=100, $0 \leq x \leq 10$, $0 \leq z \leq 40$, and $5 \leq m \leq 20$.

3. The product of claim 1, wherein said coercive force Hb ranges from 300 to 500 Oe and said coercive force Hs ranges from 800 to 1500 Oe.

4. The product of claim 1, wherein the plasma treatment of step (a) is carried out under a gas pressure of from 0.001 to 1 torr.

* * * * *